United States Patent
Sabjan et al.

(10) Patent No.: US 9,336,131 B1
(45) Date of Patent: May 10, 2016

(54) SYSTEMS AND METHODS FOR ENABLING VIRTUAL ENVIRONMENTS TO MOUNT NON-NATIVE STORAGE DISKS

(71) Applicant: Symantec Corporation, Mountain View, CA (US)

(72) Inventors: Check Sabjan, Sanford, FL (US); Lokesha Krishnamurthy, Sanford, FL (US)

(73) Assignee: Veritas Technologies, LLC, Mountain View, CA (US)

( * ) Notice: Subject to any disclaimer, the term of this patent is extended or adjusted under 35 U.S.C. 154(b) by 315 days.

(21) Appl. No.: 13/863,886

(22) Filed: Apr. 16, 2013

(51) Int. Cl.
*G06F 12/02* (2006.01)

(52) U.S. Cl.
CPC ............ *G06F 12/02* (2013.01); *G06F 2212/00* (2013.01); *G06F 2212/15* (2013.01); *G06F 2212/152* (2013.01)

(58) Field of Classification Search
CPC . G06F 9/30174; G06F 17/30215; G06F 8/65; G06F 13/102; G06F 13/385; G06F 21/6218; G06F 2201/865; G06F 8/60; G06F 9/44563; G06F 11/1469; G06F 11/3409; G06F 17/30067; G06F 17/30286; G06F 17/30386; G06F 17/30569; G06F 9/4403; G06F 9/4552; G06F 9/45554; G06F 9/45558; G06F 9/4843; G06F 2212/00; G06F 2212/15; G06F 2212/152
USPC ........ 711/114, 162, 3, 135, 173, 1, 6; 710/16, 710/10, 105; 707/E17.01, 999.1, E17.005, 707/806, 827, 831; 712/200; 718/1; 726/21, 726/27

See application file for complete search history.

(56) References Cited

U.S. PATENT DOCUMENTS

| | | | | |
|---|---|---|---|---|
| 4,953,122 A | * | 8/1990 | Williams | G06F 3/0601 369/47.14 |
| 5,544,356 A | * | 8/1996 | Robinson | G06F 3/0601 365/185.11 |
| 6,611,907 B1 | * | 8/2003 | Maeda | G06F 3/0613 711/103 |
| 7,586,855 B1 | * | 9/2009 | Yellai | H04L 12/5601 370/255 |
| 8,095,753 B1 | * | 1/2012 | Pandey | G06F 3/0605 711/112 |
| 8,230,209 B1 | * | 7/2012 | Streuter | G06F 9/441 713/1 |
| 8,694,745 B2 | | 4/2014 | Sabjan et al. | |
| 8,949,825 B1 | * | 2/2015 | Fitzgerald | G06F 9/45537 718/1 |
| 2007/0157013 A1 | * | 7/2007 | Park | G06F 9/4406 713/1 |
| 2008/0162420 A1 | * | 7/2008 | Ahrens | G06F 17/3089 |
| 2009/0228882 A1 | * | 9/2009 | Wang | G06F 9/5077 718/1 |
| 2010/0235831 A1 | * | 9/2010 | Dittmer | G06F 9/45558 711/103 |
| 2010/0257218 A1 | * | 10/2010 | Vassilev | G06F 17/30233 707/823 |

(Continued)

*Primary Examiner* — Mark Giardino, Jr.
*Assistant Examiner* — Edward Waddy, Jr.
(74) *Attorney, Agent, or Firm* — ALG Intellectual Property, LLC

(57) ABSTRACT

A computer-implemented method for enabling virtual environments to mount non-native storage disks may include (1) identifying a storage disk formatted in a format that is non-native to a virtual environment, (2) locating disk information of the storage disk that includes (i) a plurality of non-native partition table entries and (ii) a partition table pointer that points to the non-native partition table entries, and then (3) modifying the disk information to enable the virtual environment to mount the storage disk as though the storage disk were formatted in a format that is native to the virtual environment by (i) adding a plurality of native partition table entries that identify the plurality of volumes within the storage disk and then (ii) modifying the partition table pointer to point to the native partition table entries instead of the non-native partition table entries. Various other methods, systems, and computer-readable media are also disclosed.

20 Claims, 6 Drawing Sheets

(56) References Cited

U.S. PATENT DOCUMENTS

| | | | |
|---|---|---|---|
| 2011/0022883 A1* | 1/2011 | Hansen | H04L 9/085 714/2 |
| 2011/0047340 A1* | 2/2011 | Olson | G06F 11/1456 711/162 |
| 2013/0086310 A1* | 4/2013 | Shirai | G06F 12/0246 711/103 |
| 2013/0262801 A1* | 10/2013 | Sancheti | G06F 3/065 711/162 |
| 2013/0282662 A1* | 10/2013 | Kumarasamy | G06F 11/14 707/649 |

* cited by examiner

SYSTEMS AND METHODS FOR ENABLING VIRTUAL ENVIRONMENTS TO MOUNT NON-NATIVE STORAGE DISKS

BACKGROUND

Backup and restore technologies often protect both physical and virtual computing environments. In one example, a backup and restore technology may back up a physical disk in a format that is native to a physical environment. For example, a backup and restore technology may back up a physical disk in a Globally Unique Identifier Partition Table (GPT) format that is native to a physical server. In the event that the physical disk experiences a failure, the backup and restore technology may restore the physical disk from the GPT-formatted backup.

In another example, the backup and restore technology may back up a virtual disk in a format that is native to a virtual environment. For example, a backup and restore technology may back up a virtual disk in a Master Boot Record (MBR) format that is native to a virtual environment running on a host server. In the event that the virtual disk or environment experiences a failure, the backup and restore technology may restore the virtual disk from the MBR-formatted backup.

Unfortunately, some virtual environments may be unable to mount non-natively formatted disks (such as GPT-formatted disks) outside of guest machines. As a result, while conventional backup and restore technologies may protect physical and virtual environments in the ways described above, such backup and restore technologies may still have certain shortcomings and/or limitations. For example, a conventional backup and restore technology may be unable to use a GPT-formatted backup to restore individual items (such as individual emails, files, and/or folders) via a virtual environment that does not support mounting GPT-formatted disks outside of guest machines. In another example, the conventional backup and restore technology may be unable to perform a physical-to-virtual (P2V) conversion on the GPT-formatted backup since the virtual environment does not support mounting GPT-formatted disks outside of guest machines.

What is needed, therefore, are systems and methods for enabling virtual environments to mount non-natively formatted disks outside of guest machines.

SUMMARY

As will be described in greater detail below, the instant disclosure generally relates to systems and methods for enabling virtual environments to mount non-native storage disks by modifying their disk information such that the disks appear to be formatted in a native format to the virtual environments.

In one example, a computer-implemented method for enabling virtual environments to mount non-native storage disks may include (1) identifying a storage disk formatted in a format that is non-native to a virtual environment, (2) locating disk information of the storage disk that includes (i) a plurality of non-native partition table entries that identify a plurality of volumes within the storage disk and correspond to the non-native format and (ii) a partition table pointer that points to the non-native partition table entries, and then (3) modifying the disk information to enable the virtual environment to mount the storage disk as though the storage disk were formatted in a format that is native to the virtual environment by (i) adding a plurality of native partition table entries that identify the plurality of volumes within the storage disk and correspond to the native format and then (ii) modifying the partition table pointer to point to the native partition table entries instead of the non-native partition table entries.

In some examples, the non-native format may include a GPT format. In such examples, the native format may include an MBR format. Additionally or alternatively, the disk information may include a partition type identifier that identifies the non-native format of the storage disk.

In some examples, the method may also include replacing the partition type identifier that identifies the non-native format of the storage disk with another partition type identifier that identifies the native format. In such examples, the method may further include determining that the virtual environment has unmounted the storage disk. For example, the method may include detecting a request to unmount the storage disk.

In some examples, the method may include modifying the disk information to return the storage disk to the non-native format in response to determining that the virtual environment has unmounted the storage disk. In such examples, the method may include modifying the partition table pointer to point to the non-native partition table entries instead of the native partition table entries. Additionally or alternatively, the method may include replacing the other partition type identifier that identifies the native format with the partition type identifier that identifies the non-native format.

In a more specific example, the method may also include modifying the partition type identifier to indicate 0x0F instead of 0xEE. In such an example, the method may further include inserting the plurality of native partition table entries into the disk information such that the plurality of native partition table entries start at sector 34 of the storage disk. Additionally or alternatively, the method may include modifying the partition table pointer to point to sector 34 of the storage disk instead of sector 1 of the storage disk.

In some examples, the method may also include determining that the storage disk includes a physical storage disk formatted in the non-native format. In such examples, the method may further include converting the physical storage disk to a virtual storage disk formatted in the non-native format.

In some examples, the method may also include detecting a request to mount the converted virtual storage disk in the virtual environment. In such examples, the method may further include modifying the disk information to enable the virtual environment to mount the converted virtual storage disk in response to detecting the request to mount the converted virtual storage disk.

In some examples, the method may also include creating a virtual backup of the physical storage disk. In such examples, the method may further include detecting a request to restore a sub-portion of the physical storage disk from the virtual backup. Additionally or alternatively, the method may include modifying the disk information to enable the virtual environment to mount the virtual backup and then directing the virtual environment to mount the virtual backup to facilitate restoring the sub-portion of the physical disk from the virtual backup. For example, the method may include directing the virtual environment to mount the virtual backup outside of each guest machine running in the virtual environment to enable a restore application to restore the sub-portion of the physical disk from the virtual backup.

In some examples, the method may also include modifying the disk information to enable the virtual environment to mount the storage disk outside of each guest machine running in the virtual environment. In such examples, the method may include modifying the disk information such that the storage disk appears to be formatted in the native format to the virtual environment. Additionally or alternatively, the method may include maintaining both the plurality of native partition table entries and the plurality of non-native partition table entries within the disk information to facilitate converting the storage disk between the native and non-native formats.

In one embodiment, a system for implementing the above-described method may include (1) an identification module programmed to identify a storage disk formatted in a format that is non-native to a virtual environment, (2) a locating module programmed to locate disk information of the storage disk that includes (i) a plurality of non-native partition table entries that identify a plurality of volumes within the storage disk and correspond to the non-native format and (ii) a partition table pointer that points to the non-native partition table entries, and (3) a modification module programmed to modify the disk information to enable the virtual environment to mount the storage disk as though the storage disk were formatted in a format that is native to the virtual environment by (i) adding a plurality of native partition table entries that identify the plurality of volumes within the storage disk and correspond to the native format and then (ii) modifying the partition table pointer to point to the native partition table entries instead of the non-native partition table entries. The system may also include at least one processor configured to execute the identification module, the locating module, and the modification module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a storage disk formatted in a format that is non-native to a virtual environment, (2) locate disk information of the storage disk that comprises (i) a plurality of non-native partition table entries that identify a plurality of volumes within the storage disk and correspond to the non-native format and (ii) a partition table pointer that points to the non-native partition table entries, and then (3) modify the disk information to enable the virtual environment to mount the storage disk as though the storage disk were formatted in a format that is native to the virtual environment by (i) adding a plurality of native partition table entries that identify the plurality of volumes within the storage disk and correspond to the native format and then (ii) modifying the partition table pointer to point to the native partition table entries instead of the non-native partition table entries.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
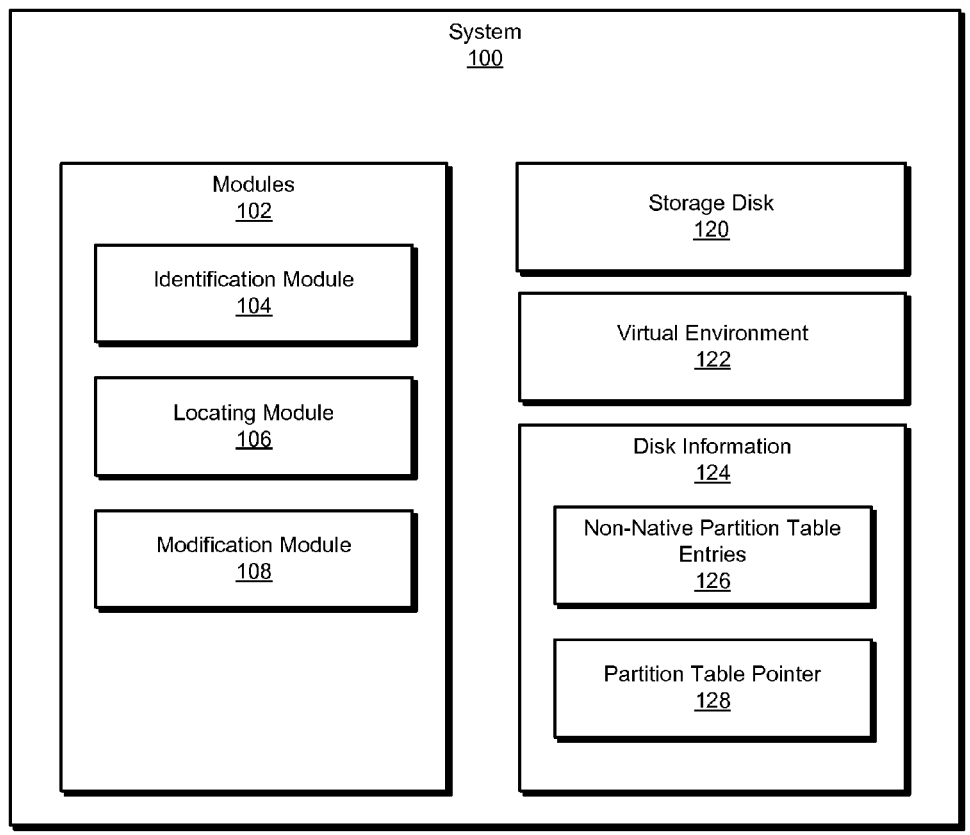
FIG. 1 is a block diagram of an exemplary system for enabling virtual environments to mount non-native storage disks.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enabling virtual environments to mount non-native storage disks. As will be explained in greater detail below, by modifying certain disk information of a storage disk formatted in a format that is non-native to a virtual environment, the various systems and methods described herein may enable the virtual environment to mount the non-native storage disk as though the storage disk were formatted in a format that is native to the virtual environment. In addition, by enabling the virtual environment to mount the non-native storage disk, the various systems and methods described herein may restore individual items (such as individual emails, files, and/or folders) from the non-native storage disk and/or perform a P2V conversion on the non-native storage disk even though the disk is formatted in a format that is non-native to the virtual environment.

The terms "mount" and "mounting," as used herein, generally refer to the act of making a storage disk accessible to a physical or virtual computing device. The act of mounting a storage disk may involve configuring a file system by which an operating system running on the physical or virtual computing device is able to read from and/or write to the storage disk.

The term "native," as used herein, generally refers to a format or disk-partitioning technique that is supported by a virtual environment as a standard feature. The virtual environment may be able to support mounting a storage disk formatted in a native format without any modification to the virtual environment. For example, the virtual environment may support mounting the native storage disk outside of one or more guest machines running in the virtual environment.

In contrast, the term "non-native," as used herein generally refers to a format or disk-partitioning technique that is not supported by a virtual environment as a standard feature. The virtual environment may be unable to mount a storage disk formatted in a non-native format without any modification to the virtual environment. For example, the virtual environment may not support mounting the non-native storage disk outside of one or more guest machines running in the virtual environment.

Figure 2:
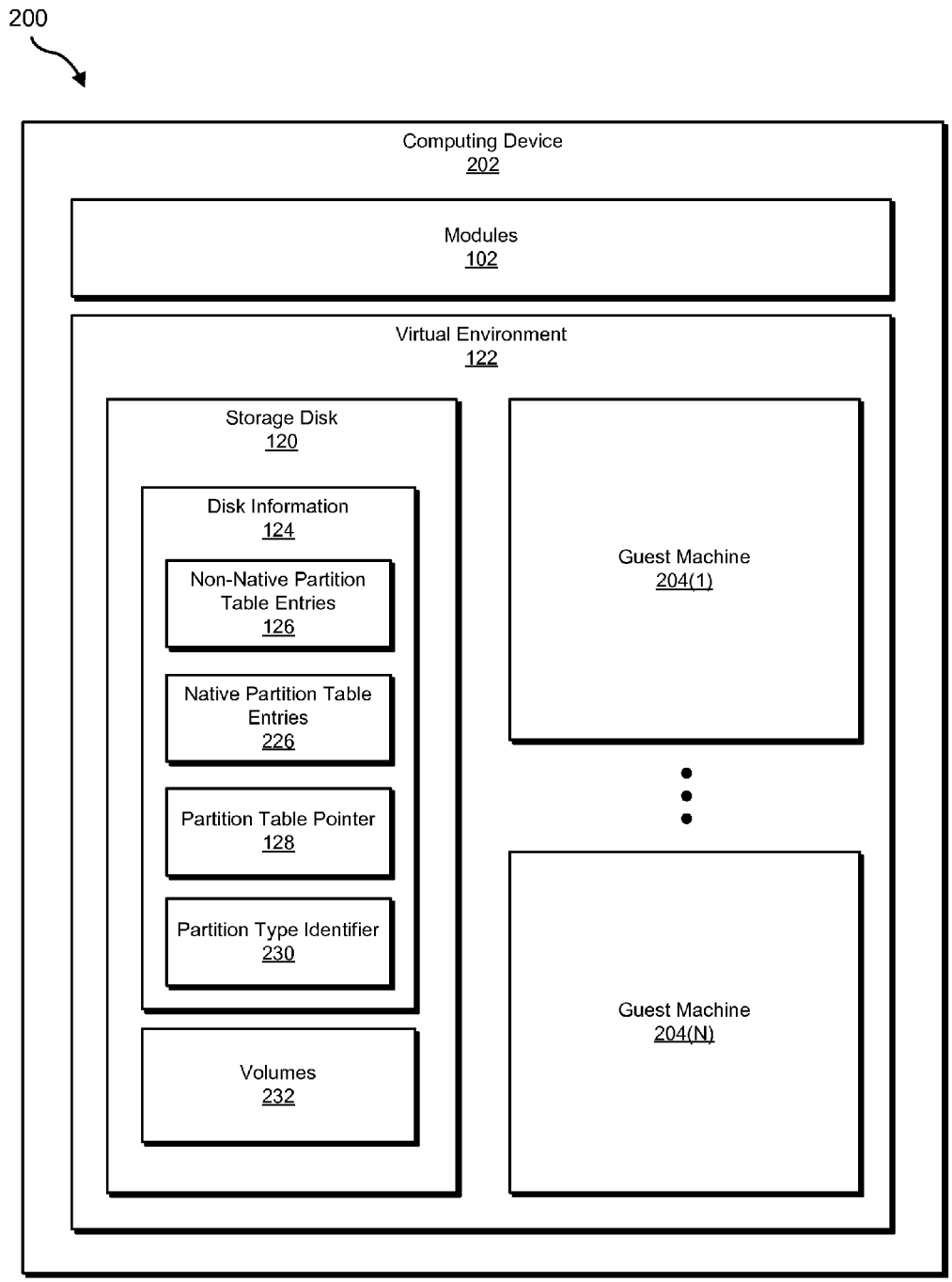
FIG. 2 is a block diagram of an exemplary system for enabling virtual environments to mount non-native storage disks.

The following will provide, with reference to FIGS. 1-2, detailed descriptions of exemplary systems for enabling virtual environments to mount non-native storage disks. Detailed descriptions of corresponding computer-implemented methods will be provided in connection with FIG. 3. Detailed descriptions of an exemplary storage disk will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enabling virtual environments to mount non-native storage disks. As illustrated in this figure, exemplary system 100 may include one or more modules 102 for performing one or more tasks. For example, and as will be explained in greater detail below, exemplary system 100 may include an identification module 104 programmed to identify a storage disk formatted in a format that is non-native to a virtual environment. Exemplary system 100 may also include a locating module 106 programmed to locate disk information of the storage disk that includes (1) a plurality of non-native partition table entries that identify a plurality of volumes within the storage disk and correspond to the non-native format and (2) a partition table pointer that points to the non-native partition table entries.

In addition, and as will be described in greater detail below, exemplary system 100 may include a modification module 108 programmed to modify the disk information to enable the virtual environment to mount the storage disk as though the storage disk were formatted in a format that is native to the virtual environment by (1) adding a plurality of native partition table entries that identify the plurality of volumes within the storage disk and correspond to the native format and (2) modifying the partition table pointer to point to the native partition table entries instead of the non-native partition table entries. Although illustrated as separate elements, one or more of modules 102 in FIG. 1 may represent portions of a single module or application (such as SYMANTEC BACKUP EXEC or SYMANTEC NETBACKUP).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more storage disks, such as storage disk 120. In one example, storage disk 120 may include at least one physical storage disk that represents physical storage space. For example, storage disk 120 may include an image of all or a portion of a hard disk drive. In this example, storage disk 120 may provide the image of all or a portion of the hard disk drive to a computing device, such as computing device 202 in FIG. 2, computing system 510 in FIG. 5, and/or portions of exemplary network architecture 600 in FIG. 6.

In another example, storage disk 120 may represent a virtual storage disk that virtualizes at least one physical storage disk. For example, storage disk 120 may virtualize all or a portion of a hard disk drive by providing a virtual mapping to all or a portion of the hard disk drive in a virtual environment running on a computing device, such as computing device 202 in FIG. 2, computing system 510 in FIG. 5, and/or portions of exemplary network architecture 600 in FIG. 6. In this example, storage disk 120 may serve and/or appear as physical storage space to the virtual environment.

Storage disk 120 may represent portions of a single disk or computing device or a plurality of disks or computing devices. For example, storage disk 120 may represent a portion of computing device 202 in FIG. 2, computing system 510 in FIG. 5, and/or portions of exemplary network architecture 600 in FIG. 6. Alternatively, storage disk 120 may represent one or more physically separate devices capable of being accessed by a computing device, such as computing device 202 in FIG. 2, computing system 510 in FIG. 5, and/or portions of exemplary network architecture 600 in FIG. 6.

In some embodiments, exemplary system 100 may also include one or more databases (not illustrated in FIG. 1). In one example, a database included in system 100 may be configured to store storage disk 120. Additionally or alternatively, this database may be configured to store any information and/or instructions used to facilitate mounting storage disk 120.

This database may represent portions of a single database or computing device or a plurality of databases or computing devices. For example, this database may represent a portion of computing device 202 in FIG. 2, computing system 510 in FIG. 5, and/or portions of exemplary network architecture 600 in FIG. 6. Alternatively, this database may represent one or more physically separate devices capable of being accessed by a computing device, such as computing device 202 in FIG. 2, computing system 510 in FIG. 5, and/or portions of exemplary network architecture 600 in FIG. 6.

According to various embodiments, all or a portion of exemplary system 100 in FIG. 1 may be implemented within a virtual environment. For example, modules and/or data described herein may reside and/or execute within a virtual machine. The phrase "virtual machine," as used herein, generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

As illustrated in FIG. 1, exemplary system 100 may also include one or more virtual environments, such as virtual environment 122. In one example, virtual environment 122 may create and/or execute one or more virtual machines (e.g., guest machines 204(1)-(N) in FIG. 2). In this example, virtual environment 122 may also enable such virtual machines to mount and/or access one or more virtual storage disks (e.g., storage disk 120).

Examples of virtual environment 122 include, without limitation, VMWARE virtual environments (such as VMWARE VSPHERE, VMWARE VCLOUD, VMWARE FUSION, VMWARE WORKSTATION, VMWARE HORIZON VIEW, and/or VMWARE VCENTER OPERATIONS MANAGEMENT SUITE), CITRIX virtual environments (such as XENSERVER, CLOUDPLATFORM, CLOUDPORTAL, XENDESKTOP, XENAPP, XENCLIENT, and/or VDI-IN-A-BOX), ORACLE virtual environments (such as ORACLE VM SERVER, ORACLE VM VIRTUAL BOX, and/or ORACLE DESKTOP VIRTUALIZATION), MICROSOFT virtual environments (such as MIRCROSOFT HYPER-V SERVER), and/or any other suitable virtual environment.

As illustrated in FIG. 1, exemplary system 100 may also include various information, such as disk information 124. In one example, disk information 124 may include information about storage disk 120. For example, disk information 124 may include non-native partition table entries 126 that identify volumes within storage disk 120 and correspond to a format (such as a GPT format) that is non-native to virtual environment 122. In this example, disk information 124 may also include partition table pointer 128 that initially points to non-native partition table entries 126.

Exemplary system 100 in FIG. 1 may be implemented in a variety of ways. For example, all or a portion of exemplary system 100 may represent portions of exemplary system 200 in FIG. 2. As shown in FIG. 2, system 200 may include virtual environment 122 installed on a computing device 202. Computing device 202 may be programmed with one or more of modules 102 and/or may store storage disk 120.

As illustrated in FIG. 2, virtual environment 122 may include storage disk 120 and guest machines 204(1)-(N). In one example, guest machines 204(1)-(N) may represent virtual machines created by virtual environment 122 and/or virtual machines capable of running in virtual environment 122. In this example, guest machines 204(1)-(N) may be capable of accessing storage disk 120 in virtual environment 122 after virtual environment 122 has mounted storage disk 120.

As illustrated in FIG. 2, storage disk 120 may include disk information 124 and volumes 232. In one example, disk information 124 may include non-native partition table entries 126, native partition table entries 226, partition table pointer 128, and partition type identifier 230. In this example, native partition table entries 226 may identify volumes 232 within storage disk 120 and correspond to a format (such as an MBR format) that is non-native to virtual environment 122. Additionally or alternatively, partition type identifier 230 may identify the type(s) of formatting and/or partitioning implemented on storage disk 120.

In one example, volumes 232 may include particular storage locations within storage disk 120. For example, volumes 232 may include all or a portion of at least one partition of storage disk 120. Additionally or alternatively, volumes 232 may include all or a portion of at least one file system residing on the partition of storage disk 120.

In one embodiment, one or more of modules 102 from FIG. 1 may, when executed by at least one processor of computing device 202, facilitate computing device 202 in enabling virtual environments to mount non-native storage disks. For example, and as will be described in greater detail below, one or more of modules 102 may cause computing device 202 to (1) identify storage disk 120 formatted in a format that is non-native to virtual environment 122, (2) locate disk information 124 that includes (i) a plurality of non-native partition table entries 126 that identify a plurality of volumes 232 within storage disk 120 and correspond to the non-native format and (ii) partition table pointer 128 that points to non-native partition table entries 126, and then (3) modify disk information 124 to enable virtual environment 122 to mount storage disk 120 as though storage disk 120 were formatted in a format that is native to virtual environment 122 by (i) adding a plurality of native partition table entries 226 that identify the plurality of volumes 232 within storage disk 120 and correspond to the native format and then (ii) modifying partition table pointer 128 to point to native partition table entries 226 instead of non-native partition table entries 126.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device.

Figure 3:
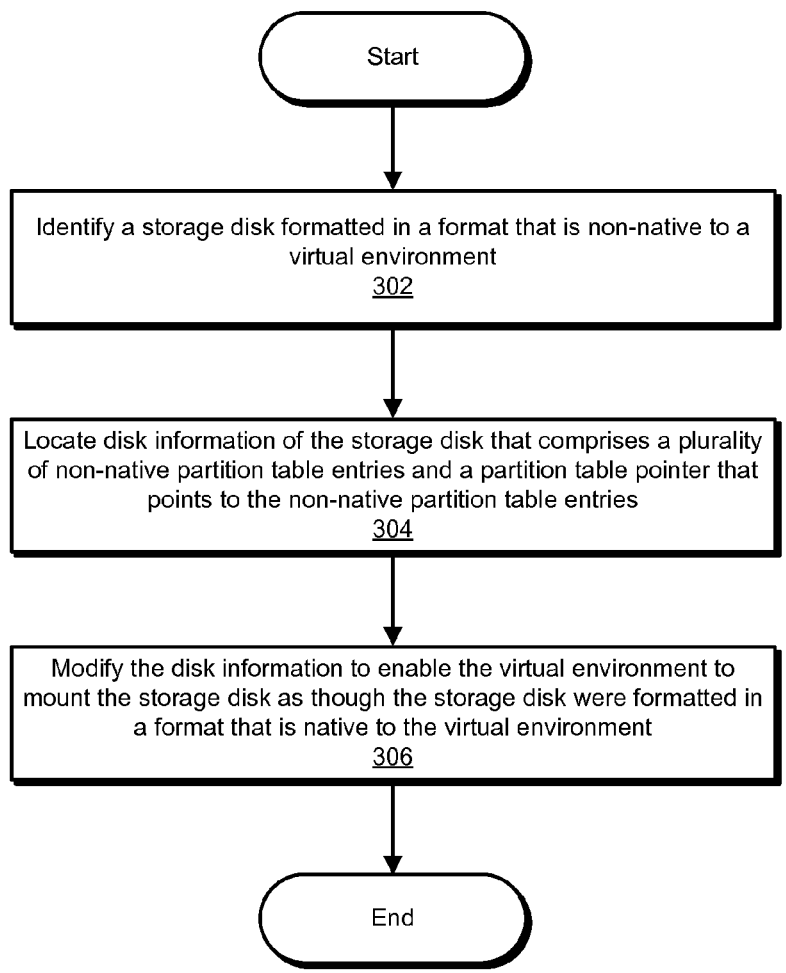
FIG. 3 is a flow diagram of an exemplary method for enabling virtual environments to mount non-native storage disks.

FIG. 3 is a flow diagram of an exemplary computer-implemented method 300 for enabling virtual environments to mount non-native storage disks. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a storage disk formatted in a format that is non-native to a virtual environment. For example, at step 302 identification module 104 may, as part of computing device 202 in FIG. 2, identify storage disk 120 formatted in a GPT format that is non-native to virtual environment 122. In one example, storage disk 120 may represent a backup image of at least a portion of computing device 202. In another example, storage disk 120 may represent a backup image of at least a portion of an additional computing device (not illustrated in FIG. 2).

The systems described herein may perform step 302 in a variety of ways. In one example, identification module 104 may identify storage disk 120 as a backup application captures storage disk 120 to serve as a backup image. For example, SYMANTEC BACKUP EXEC may perform a backup operation on a computing device. In this example, during the backup operation, SYMANTEC BACKUP EXEC may generate storage disk 120 to serve as a backup image of the computing device. Identification module 104 may then identify storage disk 120 as SYMANTEC BACKUP EXEC generates storage disk 120.

In one example, identification module 104 may identify storage disk 120 as the backup application uploads storage disk 120 to a backup database. For example, SYMANCTEC BACKUP EXEC may upload storage disk 120 to the cloud to facilitate restoring storage disk 120 in the event that the computing device experiences a failure. In this example, identification module 104 may identify storage disk 120 as SYMANTEC BACKUP EXEC uploads storage disk 120 to the cloud.

In one example, identification module 104 may identify storage disk 120 after the backup application has generated and stored storage disk 120. For example, identification module 104 may scan the backup database and/or the cloud to identify any backup images generated and stored by SYMANTEC BACKUP EXEC. In this example, while performing the scan, identification module 104 may identify storage disk 120 as having been generated and stored by SYMANTEC BACKUP EXEC.

In one example, identification module 104 may identify storage disk 120 in response to a request to mount storage disk 120 in virtual environment 122. For example, a user of SYMANTEC BACKUP EXEC may submit a request to mount storage disk 120 in virtual environment 122 upon discovering that his or her computing device (from which storage disk 120 was captured) has experienced a failure. In this example, identification module 104 may search the backup database and/or the cloud for storage disk 120 in response to the request submitted by the user. Identification module 104 may then identify storage disk 120 during the search.

In some examples, identification module 104 may determine that storage disk 120 represents a physical GPT-formatted backup. In other examples, identification module 104 may determine that storage disk 120 may represents a virtual GPT-formatted backup.

As illustrated in FIG. 3, at step 304 one or more of the systems described herein may locate disk information of the storage disk. For example, at step 304 locating module 106 may, as part of computing device 202 in FIG. 2, locate disk information 124 that identifies the configuration and/or format of storage disk 120. In this example, disk information 124 may include a plurality of non-native partition table entries 126 that identify a plurality of volumes 232 within storage disk 120 and correspond to the non-native GPT format. Disk information 124 may also include partition table pointer 128 that points to non-native partition table entries 126.

The systems described herein may perform step 304 in a variety of ways. In one example, locating module 106 may locate at least a portion of disk information 124 within storage disk 120. In another example, locating module 106 may locate at least a portion of disk information 124 within a backup database associated with the backup application that captured storage disk 120.

In one example, locating module 106 may locate disk information 124 distributed across various sectors of storage disk 120. For example, locating module 106 may search sector 0 (sometimes referred to as the MBR) of storage disk 120 for partition type identifier 230. In this example, locating module 106 may locate partition type identifier 230 during the search of sector 0.

In one example, partition type identifier 230 may identify the format of storage disk 120. For example, partition type identifier 230 may indicate that 0xEE is the partition type of storage disk 120. In this example, 0xEE may correspond to the partition type of the GPT format.

In one example, locating module 106 may also search sector 0 of storage disk 120 for partition table pointer 128. In this example, locating module 106 may locate partition table pointer 128 during the search of sector 0.

In one example, partition table pointer 128 may point to the starting sector of the partition table entries for the format of storage disk 120. For example, partition table pointer 128 may point to sector 1 of storage disk 120. In this example, sector 1 of storage disk 120 may correspond to the starting sector of the partition table entries for the GPT format. The starting sector of the partition table entries for the GPT format may include a primary GPT header that identifies storage disk 120 and further points to section 2 of storage disk 120.

In one example, locating module 106 may read partition table pointer 128 to identify the starting sector of non-native table entries 126. For example, locating module 106 may read partition table pointer 128 as pointing to sector 1. In this example, locating module 106 may determine that sector 1 of storage disk 120 is the starting sector of non-native partition table entries 126 based at least in part on partition table pointer 128.

In one example, locating module 106 may search sector 1 of storage disk 120 for the starting sector of non-native partition table entries 126 in response to the determination. In this example, locating module 106 may then locate the primary GPT header in sector 1 and the start of non-native partition table entries 126 in sector 2 during the search.

In one example, non-native partition table entries 126 may extend from sector 2 to sector 34 of storage disk 120. In this example, each of non-native partition table entries 126 may identify and/or point to a different volume included in volumes 232 of storage disk 120.

In one example, locating module 106 may determine that storage disk 120 is formatted in the non-native format based at least in part on disk information 124. For example, upon locating disk information 124, locating module 106 may analyze disk information 124 to determine the format of storage disk 120. In this example, locating module 106 may determine that storage disk 120 is formatted in the non-native GPT format based at least in part on the analysis.

As illustrated in FIG. 3, at step 306 one or more of the systems described herein may modify the disk information to enable the virtual environment to mount the storage disk as though the storage disk were formatted in a format that is native to the virtual environment. For example, at step 306 modification module 108 may, as part of computing device 202 in FIG. 2, modify disk information 124 to enable virtual environment 122 to mount storage disk 120 as though storage disk 120 were formatted in an MBR format that is native to virtual environment 122.

The systems described herein may perform step 306 in a variety of ways. In some examples, modification module 108 may modify disk information 124 such that storage disk 120 appears to be formatted in the native format to virtual environment 122. In one example, modification module 108 may replace partition type identifier 230 with another partition type identifier that identifies the native format. For example, modification module 108 may modify partition type identifier 230 to indicate that 0x0F is the partition type of storage disk 120 instead of 0xEE. In this example, 0x0F may correspond to the partition type of the MBR format.

Additionally or alternatively, modification module 108 may add a plurality of partition table entries 226 that correspond to the native format of storage disk 120 into disk information 124. For example, modification module 108 may create native partition table entries 226 that correspond to the native MBR format and then insert native partition table entries 226 between sectors 34 and 2048 of storage disk 120. In this example, the area between sectors 34 and 2048 of storage disk 120 may be unused and/or reserved. In other words, some MBR- and GPT-formatted disks may include no meaningful data or information between sectors 34 and 2048.

In one example, modification module 108 may create native partition table entries 226 based at least in part on non-native partition table entries 126. For example, modification module 108 may translate partition table entries 126 from the GPT format into the MBR format. Modification module 108 may then store the translated entries between sectors 34 and 2048 of storage disk 120 as native partition table entries 226.

In one example, modification module 108 may link native partition table entries 226 together with a linked list that includes a plurality of extended boot records. For example, modification module 108 may create a plurality of extended boot records that link native partition table entries 226 together between sectors 34 and 2048 of storage disk 120. In this example, modification module 108 may further link the extended boot records together with the MBR by modifying partition table pointer 128 included in the MBR to point to native partition table entries 226.

In one example, modification module 108 may modify partition table pointer 128 to point to native partition table entries 226 instead of non-native partition table entries 126. For example, modification module 108 may modify partition table pointer 128 to point to sector 34 of storage disk 120 instead of sector 1 of storage disk 120. In this example, since modification module 108 has inserted native partition table entries 226 between sectors 34 and 2048 of storage disk 120, sector 34 may now correspond to the starting sector of the partition table entries for the MBR format.

Figure 4:
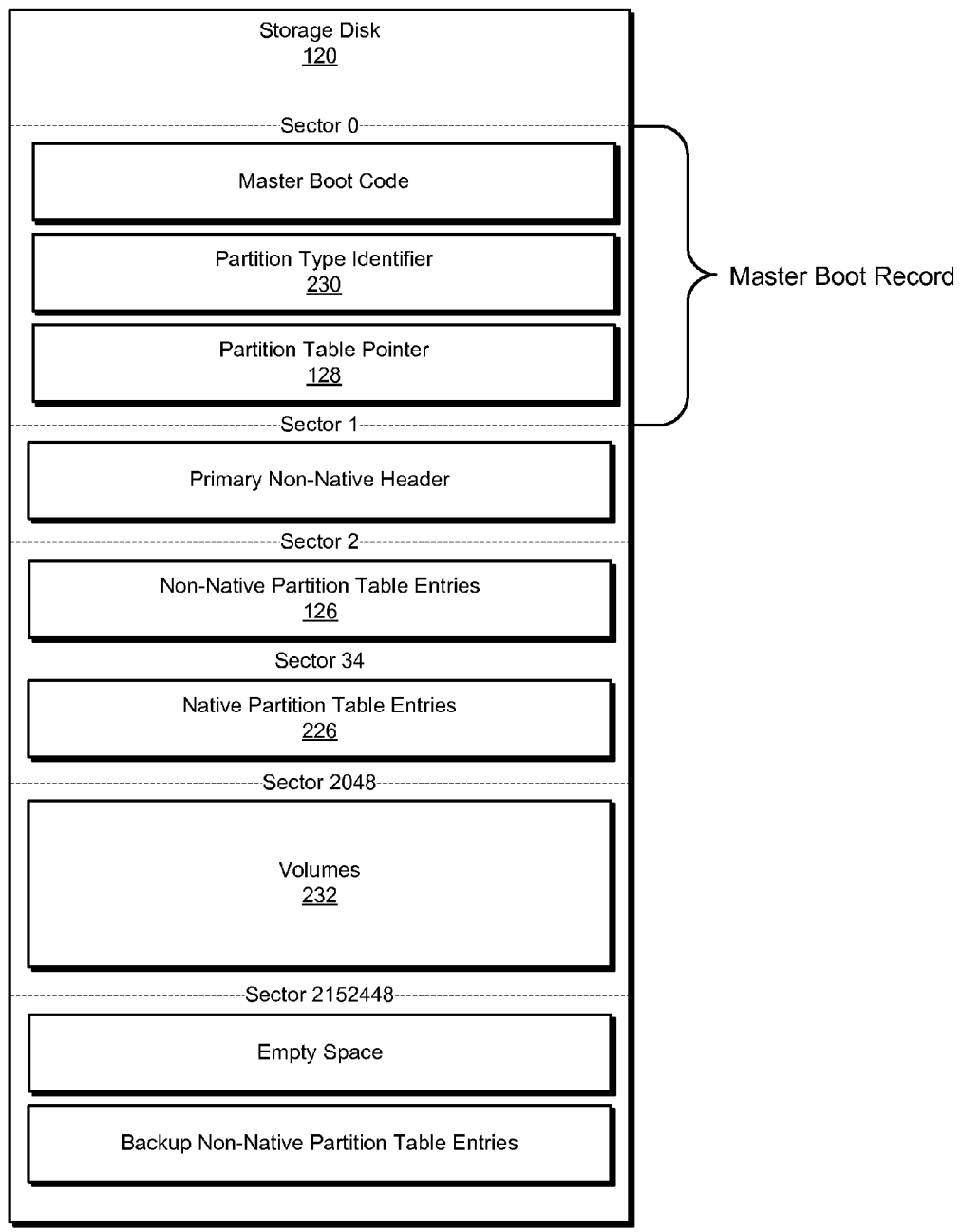
FIG. 4 is an illustration of an exemplary storage disk.

FIG. 4 illustrates an exemplary storage disk 120 after modification module 108 has modified the corresponding disk information as described above. As illustrated in FIG. 4, storage disk 120 may include an MBR that identifies the master boot code, partition type identifier 230, and partition table pointer 128 between sectors 0 and 1, a primary non-native header (e.g., a primary GPT header) between sectors 1 and 2, non-native partition table entries 126 (e.g., GPT partition table entries) between sectors 2 and 34, native partition table entries 226 (e.g., MBR partition table entries) between sectors 34 and 2048, volumes 232 between sectors 2048 and 2152448, and empty space and backup non-native partition table entries after sector 2152448.

In some examples, after modification module 108 has modified disk information 124, virtual environment 122 may recognize storage disk 120 as being formatted in the MBR format. In such examples, virtual environment 122 may be able to successfully mount storage disk 120 outside of guest machines 204(1)-(N) even though storage disk 120 does not follow the typical MBR format. As will be described in greater detail below, by enabling virtual environment 122 to mount storage disk 120, modification module 108 may facilitate restoring individual items (such as individual emails, files, and/or folders) from storage disk 120 and/or performing a P2V conversion on storage disk 120 via virtual environment 122.

In some examples, modification module 108 may determine that storage disk 120 is a physical storage disk formatted in the non-native format. For example, modification module 108 may analyze disk information 124 to determine whether storage disk 120 is a GPT-formatted physical disk. In this example, modification module 108 may determine that storage disk 120 is a GPT-formatted physical disk based at least in part on the analysis. Upon determining that storage disk 120 is a GPT-formatted physical disk, modification module 108 may convert storage disk 120 to a GPT-formatted virtual disk by creating a virtual backup of the GPT-formatted physical disk.

In one example, modification module 108 may detect a request to restore a sub-portion of the GPT-formatted physical disk from the virtual backup without restoring the entire virtual backup. For example, the user of SYMANTEC BACKUP EXEC may submit a request to restore one or more individual files backed up in the GPT-formatted physical disk via virtual environment 122. In this example, modification module 108 may detect the request submitted by the user. In response to detecting the request, modification module 108 may modify disk information 124 and then direct virtual environment 122 to mount the virtual backup via virtual environment 122.

In one example, modification module 108 may direct virtual environment 122 to mount the virtual backup outside of each guest machine running in virtual environment 122. For example, modification module 108 may direct virtual environment 122 to mount the virtual backup outside of guest machines 204(1)-(N). In this example, modification module 108 may format and/or catalog the data stored in the volumes of the mounted virtual backup. After modification module 108 has formatted and/or cataloged the data stored in the mounted virtual backup, SYMANTEC BACKUP EXEC may restore the user's individual files using GRANULAR RECOVERY TECHNOLOGY.

In some examples, modification module 108 may determine that virtual environment 122 has unmounted or is about to unmount storage disk 120. For example, modification module 108 may detect a request to unmount storage disk 120 from the user of SYMANTEC BACKUP EXEC. In this example, modification module 108 may modify disk information 124 to return storage disk 120 to the GPT format in response to detecting the request. More specifically, modification module 108 may modify partition table pointer 128 to point to sector 1 instead of sector 34 and partition type identifier 230 to indicate 0xEE instead of 0x0F.

In one example, modification module 108 may maintain both native partition table entries 226 and non-native partition table entries 126 within disk information 124. In this example, by maintaining both native partition table entries 226 and non-native partition table entries 126 within disk information 124, modification module 108 may be able to dynamically convert storage disk 120 between the MBR and GPT formats.

As explained above in connection with method 300 in FIG. 3, some virtual environments may be unable to support mounting GPT-formatted disks. For example, VMWARE WORKSTATION may be unable to mount GPT-formatted disks outside of guest machines. VMWARE WORKSTATION's inability to mount GPT-formatted disks may limit the effectiveness of the GRANULAR RECOVERY TECHNOLOGY and/or the P2V conversion provided by SYMANTEC BACKUP EXEC. In an effort to overcome this limitation, SYMANTAC BACKUP EXEC may provide a solution that enables VMWARE WORKSTATION to mount GPT-formatted disk.

In one example, a user may back up his or her laptop as a physical GPT-formatted disk with SYMANTEC BACKUP EXEC. After backing up the laptop, the user may notice that a particular file stored on the laptop has become corrupt or unusable. The user may then submit a request to restore the particular file to the laptop without restoring the entire backup to the laptop.

In response to the request, SYMANTEC BACKUP EXEC may prepare the physical GPT-formatted disk to be mountable by VMWARE WORKSTATION. For example, SYMANTEC BACKUP EXEC may convert the physical GPT-formatted disk to a virtual GPT-formatted disk and replace the disk's GPT-type identifier with an MBR-type identifier. SYMANTEC BACKUP EXEC may also add various MBR-formatted table entries that identify the disk's volumes to sector 34 of the disk and then modify the disk's table partition pointer to point to these MBR-formatted table entries.

After SYMANTEC BACKUP EXEC has finished preparing the disk, VMWARE WORKSTATION may be able to mount the disk outside of guest machines as though the disk were MBR-formatted. As a result, SYMANTEC BACKUP EXEC may use the GRANULAR RECOVERY TECHNOLOGY to restore the file to the user's laptop via VMWARE WORKSTATION.

Accordingly, by modifying certain disk information of a GPT-formatted disk, SYMANTEC BACKUP EXEC may enable VMWARE WORKSTATION to mount the disk as though the disk were MBR-formatted. In addition, by enabling VMWARE WORKSTATION to mount the disk, SYMANTEC BACKUP EXEC may restore individual items (such as individual emails, files, and/or folders) from the disk and/or perform a P2V conversion on the disk even though the disk is not formatted in the MBR format.

Figure 5:
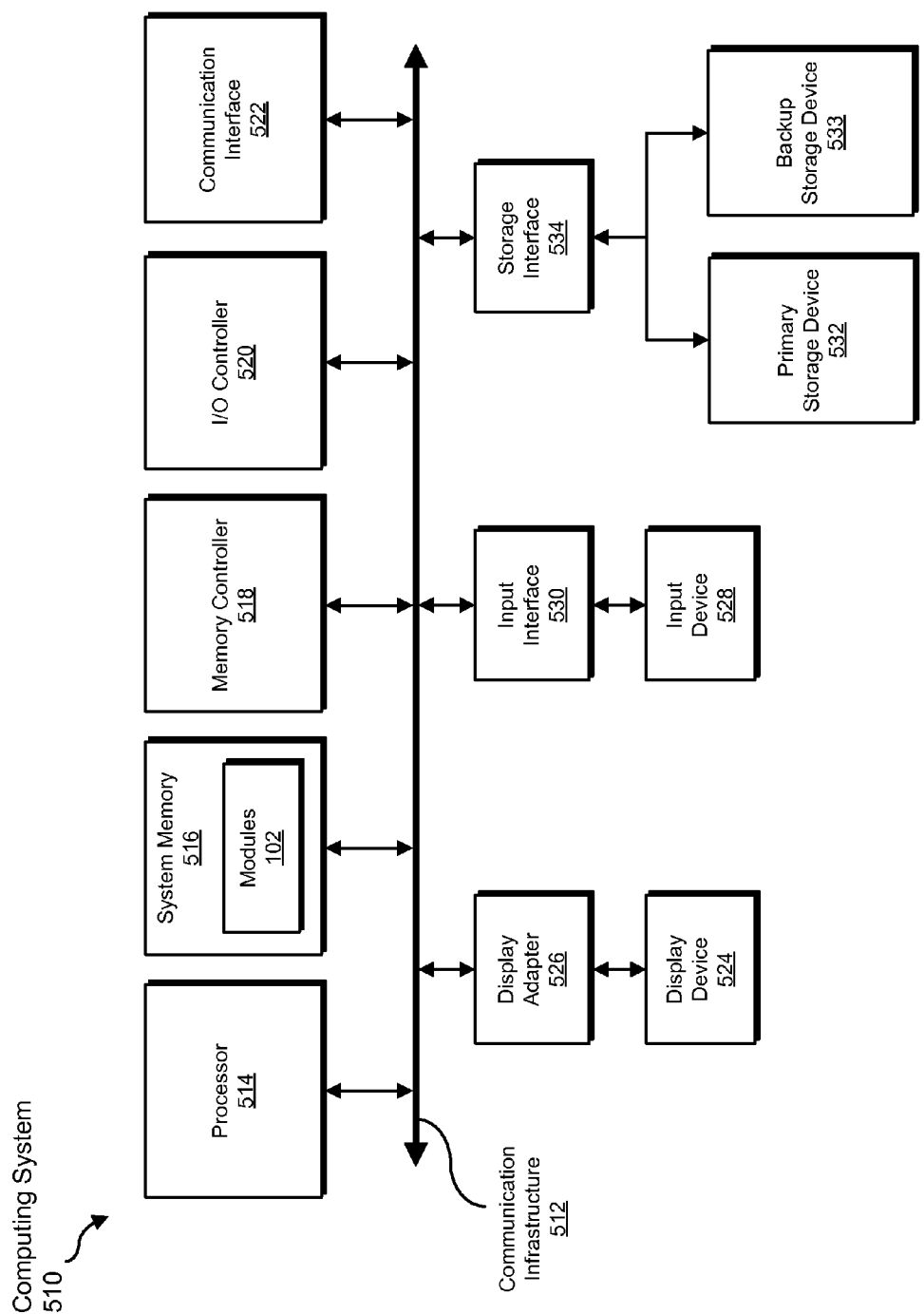
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, locating, modifying, adding, replacing, determining, inserting, converting, detecting, creating, directing, and maintaining steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
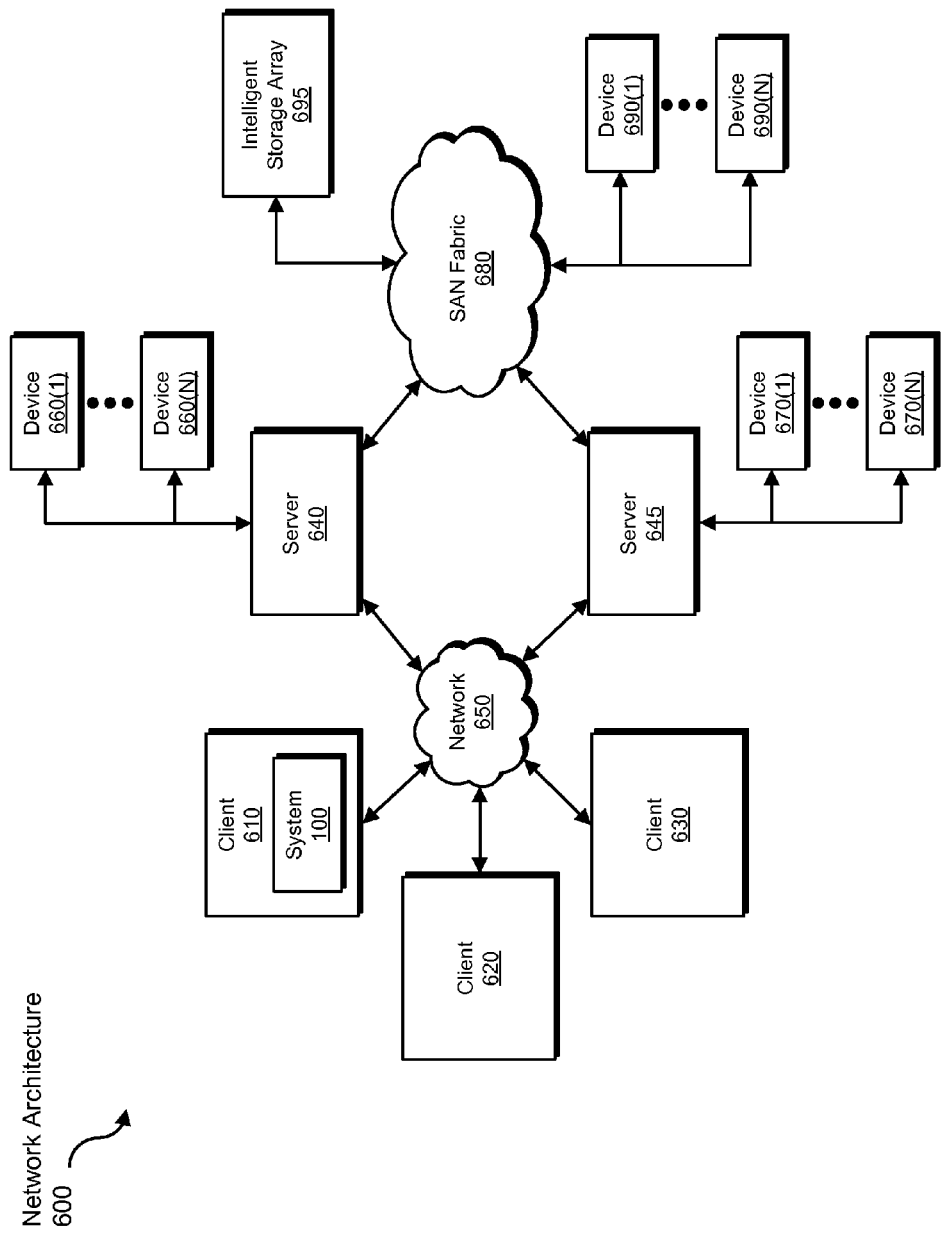
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, locating, modifying, adding, replacing, determining, inserting, converting, detecting, creating, directing, and maintaining steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for enabling virtual environments to mount non-native storage disks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive disk information to be transformed, transform the disk information, output a modified storage disk as a result of the transformation, use the modified storage disk to restore one or more files to a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enabling virtual environments to mount non-native storage disks, at least a portion of the method being performed by a computing device comprising at least one processor, the method comprising:

identifying a storage disk formatted in a format that is non-native to a virtual environment;

locating disk information of the storage disk that comprises:

a partition type identifier that identifies the non-native format of the storage disk;

a plurality of non-native partition table entries that identify a plurality of volumes within the storage disk and correspond to the non-native format;

a partition table pointer that points to the non-native partition table entries;

modifying the disk information to enable the virtual environment to mount the storage disk as though the storage disk were formatted in a format that is native to the virtual environment by:

replacing the partition type identifier that identifies the non-native format of the storage disk with another partition type identifier that identifies the native format;

adding, to an area of the storage disk that is unused or reserved, a plurality of native partition table entries that identify the plurality of volumes within the storage disk and correspond to the native format;

linking the native partition table entries together with a linked list, wherein linking the native partition table entries comprises:

creating a plurality of extended boot records that link the native partition table entries together between Sector 34 and Sector 2048 of the storage disk;
linking the extended boot records together with a Master Boot Record of the storage disk by modifying the partition table pointer to point to the native partition table entries;
modifying the partition table pointer to point to the native partition table entries instead of the non-native partition table entries.

2. The method of claim 1, wherein:
the non-native format comprises a Globally Unique Identifier Partition Table format;
the native format comprises a Master Boot Record format.

3. The method of claim 1, wherein modifying the disk information to enable the virtual environment to mount the storage disk comprises modifying the disk information to enable the virtual environment to mount the storage disk outside of each guest machine running in the virtual environment.

4. The method of claim 1, further comprising:
determining that the virtual environment has unmounted the storage disk;
in response to determining that the virtual environment has unmounted the storage disk, modifying the disk information to return the storage disk to the non-native format by:
modifying the partition table pointer to point to the non-native partition table entries instead of the native partition table entries;
replacing the other partition type identifier that identifies the native format with the partition type identifier that identifies the non-native format.

5. The method of claim 4, wherein determining that the virtual environment has unmounted the storage disk comprises detecting a request to unmount the storage disk.

6. The method of claim 1, wherein modifying the disk information to enable the virtual environment to mount the storage disk comprises:
modifying the partition type identifier to indicate 0x0F instead of 0xEE;
inserting the plurality of native partition table entries into the disk information such that the plurality of native partition table entries start at Sector 34 of the storage disk;
modifying the partition table pointer to point to Sector 34 of the storage disk instead of Sector 1 of the storage disk.

7. The method of claim 1, further comprising:
determining that the storage disk comprises a physical storage disk formatted in the non-native format;
converting the physical storage disk to a virtual storage disk formatted in the non-native format.

8. The method of claim 7, wherein modifying the disk information to enable the virtual environment to mount the storage disk comprises:
detecting a request to mount the converted virtual storage disk in the virtual environment;
in response to detecting the request to mount the converted virtual storage disk, modifying the disk information to enable the virtual environment to mount the converted virtual storage disk.

9. The method of claim 7, wherein converting the physical storage disk to the virtual storage disk comprises creating a virtual backup of the physical storage disk.

10. The method of claim 9, wherein modifying the disk information to enable the virtual environment to mount the storage disk comprises:
detecting a request to restore a sub-portion of the physical storage disk from the virtual backup;
in response to detecting the request to restore the sub-portion of the physical storage disk:
modifying the disk information to enable the virtual environment to mount the virtual backup;
directing the virtual environment to mount the virtual backup to facilitate restoring the sub-portion of the physical disk from the virtual backup.

11. The method of claim 10, wherein directing the virtual environment to mount the virtual backup comprises directing the virtual environment to mount the virtual backup outside of each guest machine running in the virtual environment to enable a restore application to restore the sub-portion of the physical disk from the virtual backup.

12. The method of claim 1, wherein modifying the disk information to enable the virtual environment to mount the storage disk comprises modifying the disk information such that the storage disk appears to be formatted in the native format to the virtual environment.

13. The method of claim 1, wherein modifying the disk information to enable the virtual environment to mount the storage disk comprises maintaining both the plurality of native partition table entries and the plurality of non-native partition table entries within the disk information to facilitate converting the storage disk between the native and non-native formats.

14. The method of claim 1, wherein adding the plurality of native partition table entries to the area of the storage disk that is unused or reserved comprises adding, to the area of the storage disk that is unused or reserved, the plurality of extended boot records that link the native partition table entries together.

15. The method of claim 1, wherein:
the non-native format comprises a Globally Unique Identifier Partition Table format;
the native format comprises a Master Boot Record format.

16. A system for enabling virtual environments to mount non-native storage disks, the system comprising:
an identification module, stored in memory, that identifies a storage disk formatted in a format that is non-native to a virtual environment;
a locating module, stored in memory, that locates disk information of the storage disk that comprises:
a partition type identifier that identifies the non-native format of the storage disk;
a plurality of non-native partition table entries that identify a plurality of volumes within the storage disk and correspond to the non-native format;
a partition table pointer that points to the non-native partition table entries;
a modification module, stored in memory, that modifies the disk information to enable the virtual environment to mount the storage disk as though the storage disk were formatted in a format that is native to the virtual environment by:
replacing the partition type identifier that identifies the non-native format of the storage disk with another partition type identifier that identifies the native format;
adding, to an area of the storage disk that is unused or reserved, a plurality of native partition table entries that identify the plurality of volumes within the storage disk and correspond to the native format;
linking the native partition table entries together with a linked list by:

creating a plurality of extended boot records that link the native partition table entries together between Sector 34 and Sector 2048 of the storage disk;

linking the extended boot records together with a Master Boot Record of the storage disk by modifying the partition table pointer to point to the native partition table entries;

modifying the partition table pointer to point to the native partition table entries instead of the non-native partition table entries;

at least one physical processor configured to execute the identification module, the locating module, and the modification module.

17. The system of claim 16, wherein the modification module:

modifies the partition type identifier to indicate 0x0F instead of 0xEE;

inserts the plurality of native partition table entries into the disk information such that the plurality of native partition table entries start at Sector 34 of the storage disk;

modifies the partition table pointer to point to Sector 34 of the storage disk instead of Sector 1 of the storage disk.

18. The system of claim 16, wherein the modification module adds, to the area of the storage disk that is unused or reserved, the plurality of extended boot records that link the native partition table entries together.

19. The system of claim 16, wherein:

the non-native format comprises a Globally Unique Identifier Partition Table format;

the native format comprises a Master Boot Record format.

20. A non-transitory computer-readable-storage medium comprising one or more computer-executable instructions that, when executed by at least one processor of a computing device, cause the computing device to:

identify a storage disk formatted in a format that is non-native to a virtual environment;

locate disk information of the storage disk that comprises:
 a partition type identifier that identifies the non-native format of the storage disk;
 a plurality of non-native partition table entries that identify a plurality of volumes within the storage disk and correspond to the non-native format;
 a partition table pointer that points to the non-native partition table entries;

modify the disk information to enable the virtual environment to mount the storage disk as though the storage disk were formatted in a format that is native to the virtual environment by:
 replacing the partition type identifier that identifies the non-native format of the storage disk with another partition type identifier that identifies the native format;
 adding, to an area of the storage disk that is unused or reserved, a plurality of native partition table entries that identify the plurality of volumes within the storage disk and correspond to the native format;
 linking the native partition table entries together with a linked list by:
  creating a plurality of extended boot records that link the native partition table entries together between Sector 34 and Sector 2048 of the storage disk;
  linking the extended boot records together with a Master Boot Record of the storage disk by modifying the partition table pointer to point to the native partition table entries;
 modifying the partition table pointer to point to the native partition table entries instead of the non-native partition table entries.

* * * * *